T. M. CASS.
MOLD FOR MAKING BURIAL VAULTS.
APPLICATION FILED JUNE 9, 1908.
901,523.
Patented Oct. 20, 1908
4 SHEETS—SHEET 1.
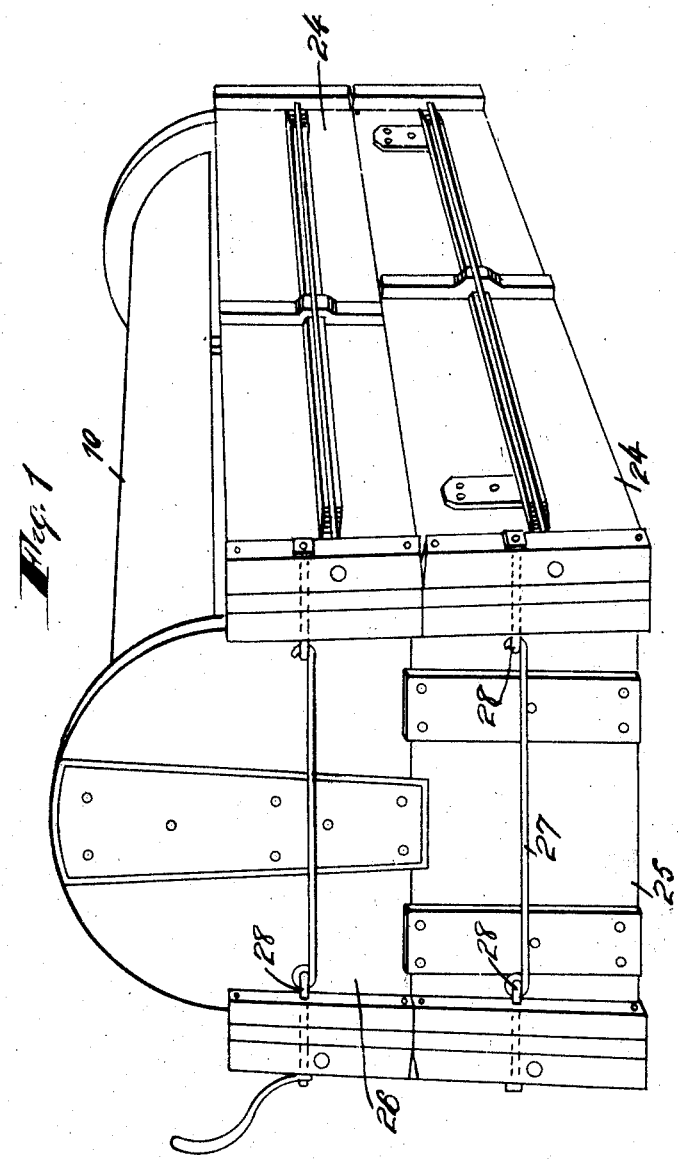
Witnesses:
B. J. Lockowski
Chas. F. Allen
Inventor,
Thomas M. Cass,
By A. L. Jackson,
Attorney

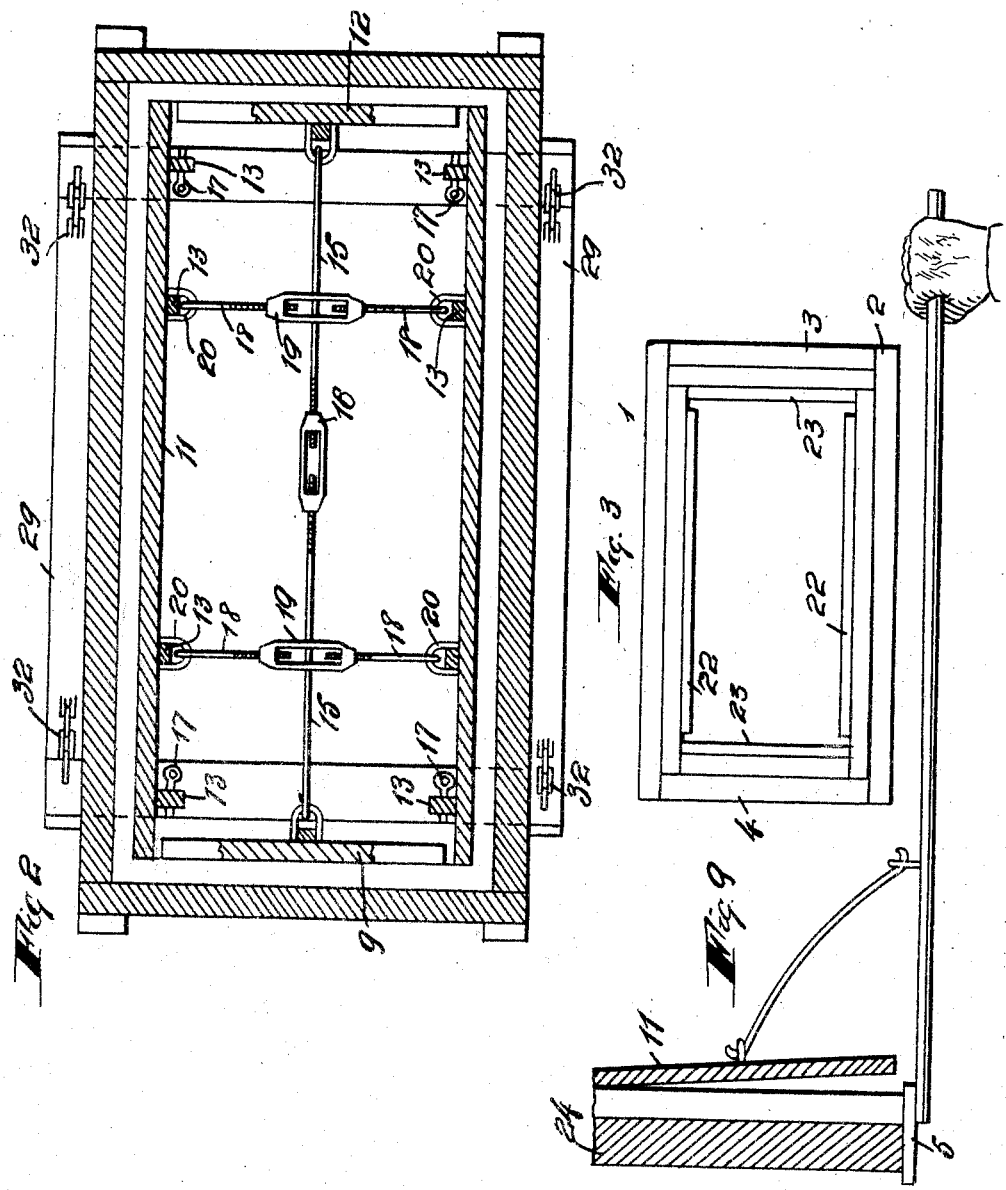

T. M. CASS.
MOLD FOR MAKING BURIAL VAULTS.
APPLICATION FILED JUNE 9, 1908.
901,523.
Patented Oct. 20, 1908
4 SHEETS—SHEET 3.
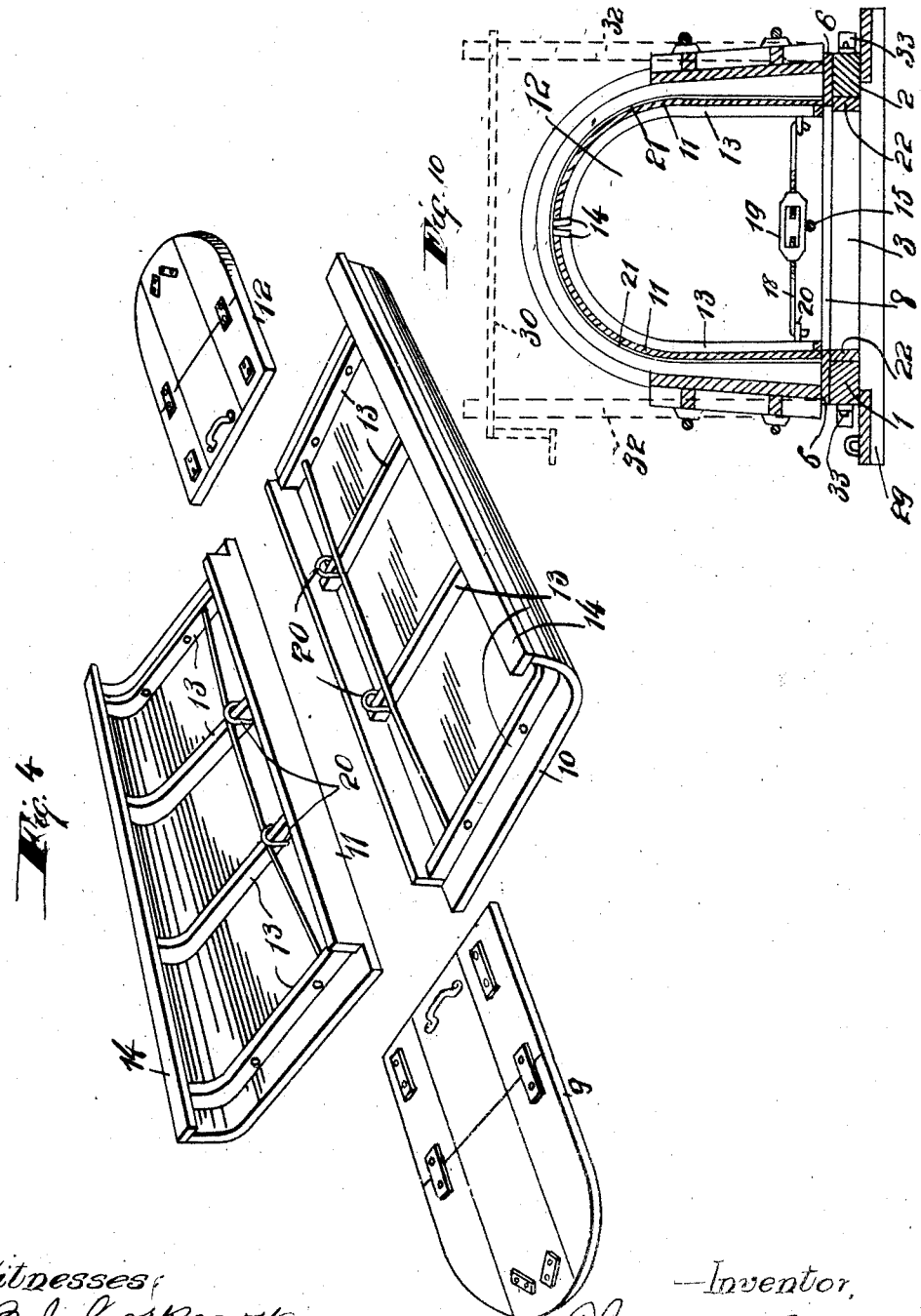
Witnesses:
B. J. Loskowske
Chas. F. Allen
Inventor,
Thomas M. Cass,
By A. L. Jackson
Attorney T. M. CASS.
MOLD FOR MAKING BURIAL VAULTS.
APPLICATION FILED JUNE 9, 1908.
901,523.
Patented Oct. 20, 1908.
4 SHEETS—SHEET 4.
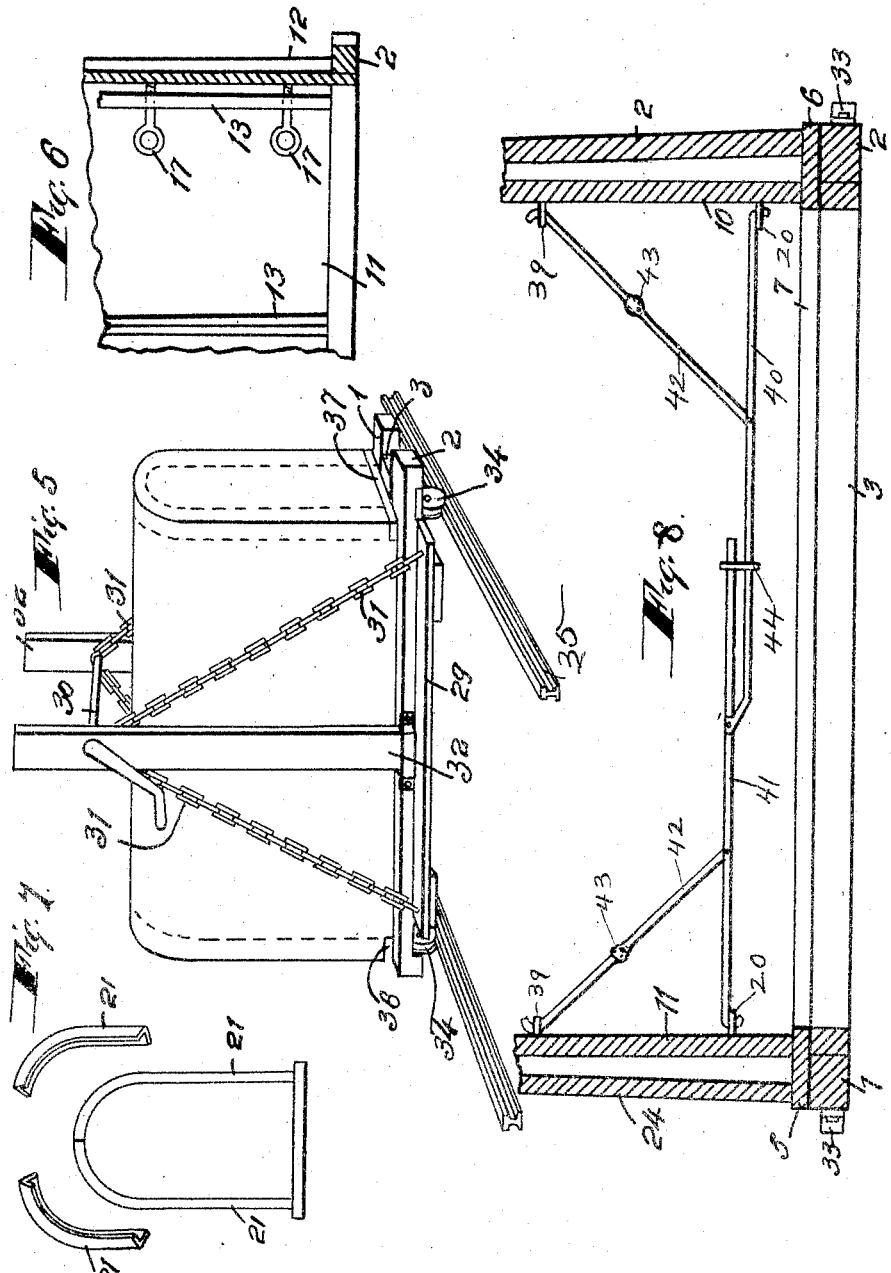
Witnesses:
B. J. Lorkowski
Chas. F. Allen
Inventor,
Thomas M. Cass,
By A. L. Jackson.
Attorney

UNITED STATES PATENT OFFICE.

THOMAS M. CASS, OF FORT WORTH, TEXAS.

MOLD FOR MAKING BURIAL-VAULTS.

No. 901,523.

Specification of Letters Patent.

Patented Oct. 20, 1908.

Application filed June 9, 1908. Serial No. 437,453.

*To all whom it may concern:*

Be it known that I, THOMAS M. CASS, a citizen of the United States, residing at Fort Worth, Texas, have invented certain new and useful Improvements in Molds for Making Burial-Vaults, of which the following is a specification.

This invention relates to molds for manufacturing burial vaults, and particularly to molds which can be removed from the vaults without mutilating the vaults; and the object is to provide molds by which burial vaults can be manufactured quickly and economically and which will leave the vaults in position to be easily transported to storage places.

Other objects and advantages will be fully explained in the following description and the invention will be more particularly pointed out in the claims.

Reference is had to the accompanying drawings which form a part of this application and specification.

Figure 1 is a perspective view of the mold complete ready for receiving material to form a vault. Fig. 2 is a horizontal section of the same. Fig. 3 is a plan view of the frame for supporting the mold and the vault and for moving the vault. Fig. 4 is a perspective view of the interior mold knocked down. Fig. 5 is a perspective view of a vault after the outside or exterior mold is removed. Fig. 6 is a broken view, illustrating the manner of adjusting the end pieces of the interior mold. Fig. 7 is a detail view of the corner pieces which are used to protect the edges of the vaults about the ends thereof. Figs. 8 and 9 are broken views, illustrating variations from the rods and turn-buckles, shown in Fig. 2 for adjusting the interior mold. Fig. 10 is a vertical cross-section of the molds.

Similar characters of reference are used to indicate the same parts throughout the several views.

The molds are supported on a frame composed of beams 1, 2, 3, and 4. Thin boards 5, 6, 7, and 8 are placed on the supporting frame. The molds are mounted on the boards. The four pieces, 9, 10, 11, and 12 constituting the interior mold are shown in Fig. 4. The side pieces are arched at the upper parts and are provided with braces 13. The meeting faces of the side pieces 10 and 11 are provided with strips 14 which are set at an angle to each other. The boards constituting the sides 10 and 11 are attached to the braces 13. The object in setting the strips 14 at an angle to each other is to permit the side pieces 10 and 11 to be drawn inwardly at the bottom for the purpose of removal downwardly. The end pieces 9 and 12 are set between the sides 10 and 11 and are adjusted towards and from each other by rods 15 and a turnbuckle 16, the rods 15 tending to hold the end pieces at a fixed distance apart during operation. The end pieces 9 and 12 are further held and braced against inward movement by thumb-bolts 17 which operate in the braces 13. When the end pieces 9 and 12 are to be removed the thumb-bolts 17 are screwed backwards far enough to allow the end piece 12 to be drawn inside of the frame piece 2 to drop downwards. The side pieces 10 and 11 are adjusted by means of rods 18 and turn-buckles 19. The rods 18 engage staples or loops 20. The sides 10 and 11 may be expanded or contracted by the turn-buckles 19 and the rods 18.

When the interior molds are to be removed from the formed vault, the sides 10 and 11 are contracted until they will pass down between the supporting beams 1 and 2. The strips 14 permit this contracting of the sides 10 and 11. Corner caps 21 are provided for each end of the vault (See Fig. 7). Fig. 5 shows by dotted outline substantially the location of the corner caps. These caps are placed on the corners of the interior mold to keep the mold from adhering to the interior of the vault. The corner caps 21 may be made of thin metal so that the interference with the vault will be immaterial. The side supporting frame pieces 1 and 2 have ledges 22 cut away in the corners, as shown in Fig. 3, so that the interior end pieces 9 and 12 may descend as they clear the ledges 23 of the supports 3 and 4.

The exterior molds are formed of side pieces 24 which may be strengthened in any suitable manner. End pieces 25 and 26 are provided and when assembled occupy places between the ends of the side 24. The side pieces 24 may be clamped on the end pieces 25 and 26 by rods 27 and screw bolts 28. The side pieces 24 do not extend over the arched portion of the interior molds but the upper end pieces 26 extend higher than the arched portions of the interior mold. The material for making the vault is placed on the arched portion of the interior mold and the end pieces 26 must extend at least as high as the thickness of the vault. The material is formed on the arched portion of the interior mold by suitable troweling.

The interior molds are removed from the vaults by releasing the same as heretofore described and by the vertically movable platform 29 which receives the interior molds. The platform 29 is moved vertically by a windlass 30 and chains 31. The windlass 30 is journaled in bearings in the uprights 32 which are removably mounted in the supports 1 and 2. The uprights 32 are held in operative positions by the brackets 33. After the interior molds are removed the windlass 30 with its bearings may be removed and the formed vault carried away on the supporting platform which is provided with rollers 34. Tracks 35 are provided for the rollers 34.

The variation shown in Fig. 8 consists of levers 41 and 40 which engage the staples 20 and are pivotally connected together and of link bars 42 which engage staples 39 and are pivotally connected to the levers 41 and 40. The links 42 are jointed at 43 for convenience of operation. When holding molds in place the levers 40 and 41 are held in the fixed position by a ring 44 and the link bars 42 brace the upper part of the side molds and hold the levers 40 and 41 rigid. The link bars 42 break in only one direction. When the molds are to be removed, the ring 44 is removed from the lever 41 and the joints of the link bars are broken so that the molds may be drawn inwardly.

Means are provided for cut outs in the ends of the vault. These cut-outs 36 are made for convenience in placing the vaults in graves. The grabs or irons for lowering the vaults catch under the ends of the vaults in the cut-outs 36 and may be easily removed. The cut-outs are formed by placing strips or boards 37 on the supporting platform to receive the material in the plastic state. When the vault is formed and dried, the strips or boards 37 are removed. In Fig. 5 one of the strips 37 is shown in place and at the other end of the vault the strip is removed, showing the cut-out 36.

The operation is apparent from the above description. It is shown that means are provided for making vaults with the arch upward and that means are provided for removing the interior molds from the vault without disturbing the vault in any manner. Means are shown for adjusting the interior molds in and out of operative position. Means are also shown for preventing the interior molds from adhering to the formed vault. Means are also provided for making cut-outs in the lower ends of the vault so that the grab irons may be easily removed from the vault after the vault is lowered into position.

Having fully described my invention, what I claim as new and desire to secure by Letters Patent, is,—

1. Molds for making burial vaults comprising inner and outer molds, the inner molds consisting of side pieces arched at their upper parts, end pieces placed within the ends of the said side pieces, means for adjusting the said ends into and out of operative position relative said side pieces, a platform common for the inner and outer molds, and means for removing the inner molds downward through the platform.

2. Molds for making burial vaults comprising inner and outer molds, the outer molds consisting of sides and ends and means for binding the sides on the ends, the ends extending above the sides and curved to conform to the form of the vault, the inner molds consisting of sides and ends placed within the ends of the sides, the upper parts of the sides being arched over the ends, a platform common to the inner and outer molds, means for removing the inner molds from the formed vault downwardly, the side pieces of the platform being cut away for the downward passage of the end pieces of the inner molds, the sides of the inner molds having braces therein, and hand bolts operating the braces of the sides for adjusting the end pieces of the inner molds into and out of operative positions whereby the end pieces may be brought into position to pass down through the cut-outs in said platform pieces.

3. Molds for making burial vaults comprising a portable platform, interior and exterior molds mounted on said platform, said platform having an opening therethrough for the passage of said interior molds, and means for removing said interior molds downward consisting of a vertically movable platform, a windlass, and cables attached to said windlass and to said vertically movable platform.

4. Molds for making burial vaults comprising exterior and interior molds, a platform supporting said molds, corner caps removably mounted on said interior molds to prevent the interior molds from clinging to the formed vault, and means for removing the interior molds downwards through said platform.

5. Molds for making burial vaults comprising exterior and interior molds, a platform supporting said molds, said interior molds having interior braces, rods and turn-buckles for holding the parts of said interior mold in operative relation, and means for removal of said interior molds downward through said platform including rods and turn buckles and hand bolts operating in the braces of said interior molds and vertically moving platform.

In testimony whereof, I set my hand in the presence of two witnesses, this 1st day of June, 1908.

THOMAS M. CASS.

Witnesses:
　A. L. JACKSON,
　J. W. STITT.